United States Patent [19]

Andrei et al.

[11] Patent Number: 5,756,231

[45] Date of Patent: May 26, 1998

[54] COMPOSITE CATHODE, PROCESS FOR ITS PREPARATION AND ITS USE IN SOLID ELECTROLYTIC CELLS

[75] Inventors: Maria Andrei, Berceto; Massimo Soprani, Borgosesia; Giuseppe Botti, Somaglia, all of Italy

[73] Assignees: Eniricerche S.p.A., Milan; Olivetti Personal Computer S.p.A., Turin, both of Italy

[21] Appl. No.: 680,024

[22] Filed: Jul. 15, 1996

[30] Foreign Application Priority Data

Jul. 28, 1995 [IT] Italy ................. MI95A1651

[51] Int. Cl.$^6$ ................................. H01M 4/58
[52] U.S. Cl. .................. 429/218; 429/192; 204/291
[58] Field of Search ..................... 429/218, 192; 204/291

[56] References Cited

U.S. PATENT DOCUMENTS

| | | | |
|---|---|---|---|
| 4,720,910 | 1/1988 | Rourke et al. | 29/623.5 |
| 4,935,317 | 6/1990 | Fauteux et al. | 429/192 |
| 5,264,307 | 11/1993 | Andrei et al. | 429/192 |
| 5,411,819 | 5/1995 | Marchese, et al. | 429/192 |
| 5,436,091 | 7/1995 | Shackel et al. | 429/192 |

*Primary Examiner*—Bruce F. Bell
*Attorney, Agent, or Firm*—Oblon, Spivak, McClelland, Maier & Neustadt, P.C.

[57] ABSTRACT

Composite cathode comprising:

(A) a powder of active cathode material;

(B) an electronic conductor;

(C) an electrolyte essentially constituted by a polymer composition comprising:

($C_1$) a polymer deriving from the polymerisation of a vinyl ether and a divinyl ether;

($C_2$) litium tetrafluoroborate alone or in a mixture with other lithium salts.

The above-mentioned composite cathode can be employed in solid electrolytic cells.

17 Claims, No Drawings

COMPOSITE CATHODE, PROCESS FOR ITS PREPARATION AND ITS USE IN SOLID ELECTROLYTIC CELLS

This invention concerns a composite cathode. More in particular, this invention concerns a composite cathode constituted by an active cathode material, by an electronic conductor and by a polymer electrolyte, a process for its preparation and its use in solid electrolytic cells.

A ion inserting cathode material is a system able to allow the insertion of metal ions, preferably lithium ions, in its structure during the process of discharge of the cell and to allow the removal of the same ions during the charge.

In the electrolytic cells which employ inserting materials as basic components of the cathode, during the process of discharge, cations are transported from the anode to the cathode through the electrolytic membrane and insert inside the above-mentioned inserting material. During the recharge of the cell the inverse process occurs.

The oxides of transition metals are largely employed as active materials in composite cathodes which are useful in the assembly of lightweight rechargeable solid state batteries. Among the commonly employed oxides of transition metals we remind $V_6O_{13}$, $Li_xV_3O_8$, $TiS_2$, $TiO_2$, $Li_xMn_2O_4$.

Among the above-mentioned oxides, the vanadium oxide is one of the most used, since its specific capacitance equivalent to theorical 416 Ah/Kg and practical 200–250 Ah/Kg, is among the highest ones.

Even so, the quantity of vanadium oxide which is present in the cathode does rarely exceed 50% by weight of the cathode compound (the higher the percentage of $V_6O_{13}$, better the capacitance of the battery is).

Composite cathodes are constituted, besides the metal oxide which acts as an active cathode material, by an electronic conductor for the electric conduction and by an electrolyte which allows to keep the material active and the electronic conductor in close contact. The electrolyte has, moreover, the function to make the cathode compound adhere to the current collector and must, therefore, possess adhesive properties towards the metal itself. Moreover, when it is employed in solid state batteries, it is important that it possess good ionic conduction properties, in order to facilitate the migration of lithium ions inside the cathode.

On the contrary, in the presence of liquid electrolytes, as it is, for instance, described in the U.S. Pat. No. 4,751,157, the electrolyte can be a non-conducting material such as, for instance, teflon or other fluorinated polymers, because, in this case, the liquid electrolyte spreads in the cathode at the time of the assembly of the battery. In this case, the cathode is obtained by pressing the active material, in the presence of the electronic conductor and of the binder and can, eventually, be sintered.

Lithium is generally employed as an anode, because it is very electropositive and lightweight. Moreover, its specific capacitance is equivalent to 3780 Ah/Kg, and it is, therefore, ten times higher than the one of a carbon anode (coke, petroleum coke, graphite).

In the case of solid electrolytes, as already said above, the electrolyte must be constituted by a ionic but non electronic conductor polymer, in which an alkali metal salt, preferably a lithium salt, is dissolved.

The electrolyte acts as a lithium ion reservoir, allows the passage of charged particles between the two electrodes and also acts as an electronic separator.

In order to reduce the resistance to the charge passage, it is necessary to have a thin layer of electrolyte and/or a high ionic conductance of the electrolyte itself. Many systems have been recognized as potential candidates. Among them, "comb-like" amorphous polymers, constituted by ethylene oxide chains bound to polymer backbones such as vinyl ether (as it is described, for instance, in the U.S. Pat. No. 4,886,716), epoxide (as it is described, for instance, in the U.S. Pat. No. 5,162,174), methacrylate, phosphazene, siloxane, itaconate. The above-mentioned polymers have a conductivity in the order of $10^{-5}$ S/cm at 25° C.

Several approaches have been followed in order to improve the conductivity of the above-described polymers. One of the most employed methods is now known as "IPN" (Interpenetrating Polymer Network) or "gel electrolytes" which consists in incorporating into the polymeric matrix, liquids which act as plasticizers.

The polymeric matrix incorporates the plasticizer together with the lithium salt in its structure and the electrolyte thus obtained has a ionic conductance which is close to the one shown by liquid electrolytes.

Useful plasticizers are, generally, viscous liquids with a high dielectric constant ($\epsilon$), able to grant a high charge dissociation, such as, for instance, propylene carbonate (PC), ethylencarbonate (EC), $\gamma$-butyrolactone or mixtures thereof. Other plasticizers employed are based on ether compounds, such as, for instance, tetraglyme or polyethers with a low molecular weight, having a low dielectric constant but a high chemical stability to lithium.

Both conducting and non-conducting matrixes have been employed as polymers.

Polyethers functionalized with vinylether groups (as it is described, for instance, in the U.S. Pat. No. 5,411,819), acrylic and methacrylic groups belong to the first class. In the U.S. Pat. No. 5,411,819 different processes are described to obtain the electrolyte which can, in fact, be obtained directly on appropriate substrates such as, for instance, electrode surfaces, by polymerisation through UV (ultraviolet) radiations or EB (electron beam) or by polymerisation in the presence of lithium tetrafluoroborate as catalyst.

Polymers such as polyacrylonitrile (PAN), polyvinyl pyrrolidone (PVP) or poly-vinyl chloride (PVC) belong to the second class. In this case, the electrolyte is obtained by "casting".

The composite cathode based upon active material such as, for instance, $V_6O_3$, $V_2O_5$, $TiS_2$, can be obtained through several processes known in the art.

For instance, in the European patent application No. 279,554, the cathode is obtained by "casting" from dispersions of the cathode components into an inert solvent. In this case, the active cathode material ($V_6O_{13}$) and the electronic conductor (black acetylene) are dispersed into acetonitrile in the presence of polyethylene oxide (PEO), $LiClO_4$ and a mixture of plasticizers ethylencarbonate/propylene carbonate (EC/PC). The above-mentioned dispersion is then applied on a nickel sheet which acts as a current collector and the solvent is evaporated. The ponderal ratio among the various cathode components there indicated, is the following: $V_6O_{13}$/black acetylene/polymer equivalent to 45/5/50. After 85 cycles the cell capacitance is reduced by about 40%.

A process analogous to the one indicated in the above-mentioned European patent application is also described in the U.S. Pat. No. 4,631,810, in which a dispersion of $V_6O_{13}$, carbon black and polyethylene oxide (PEO) in acetonitrile is applied to a nickel collector.

In the U.S. Pat. No. 4,576,883 a procedure is described to obtain a composite cathode based upon $V_6O_{13}$, having a particularly high superficial area, obtained by encapsulating the particles of the active cathode material in the polymer component. Even in this case, the cathode is obtained by "casting".

Nevertheless, the creation of the composite cathode by "casting" from a solution causes problems of solvent recycling and recovery in the production phase and, therefore, does necessarily involve higher investment costs, beside requiring a careful control of the temperature and the evaporation velocity conditions of the solvent, to obtain homogeneous surfaces.

Another method for the preparation of the composite cathode implies the use of polymeric precursors containing functional groups which can be activated by UV (ultraviolet) radiations or EB (electron beam).

For instance, in the U.S. Pat. No. 5,326,545, $V_2O_5$ or $LiV_3O_8$ are employed together with carbon black (Shawinigan Black, 11% by weight) as an active cathode material in the presence of polyethylene oxide (PEO), propylene carbonate (PC), and a mixture of diacrylate and triacrylate. The cathode is laid down on a nickel sheet and irradiated with an electron beam to obtain the cross-linking of the acrylate component. The percentage of active material is equivalent to 49% by weight over the total quantity of the cathode compound. An analogous process is reported in the U.S. Pat. No. 4,935,317 and, in this case, the percentage of active material is equivalent to 45% by weight of the cathode compound.

In the U.S. Pat. No. 4,830,939 the active cathode material $V_6O_{13}$, the carbon black and the polymer component polyethylen-glycol diacrylate are ground in a ball mill in the presence of a solvent, the dispersion thus obtained is laid on an alluminium collector, the solvent is evaporated and the resulting film is cross-linked with an electron beam. In this case, the percentage of active material is equivalent to 50% by weight of the cathode compound.

In the European patent application No. 145,498 a method is described which allows to obtain a composite cathode by extrusion. In this case a mixture of active cathode material and acetylene black is added to a melted mixture of polyethylene oxide (PEO) and a lithium salt and the whole is extruded, eventually in the presence of a plasticizer.

One of the problems which are often incurred is in cells such as the above-described ones, is the mass and volume variation of the cathode and the anode after inserting lithium ions in the cathode and laying metallic lithium on the anode. In particular, one observes an expansion of the cathode volume during the discharge and an expansion of the anode volume during the recharge.

One of the causes of the structural variations of the cathode is the agglomeration of the particles of active material which generally implies a slower diffusion process of the charged particles in the cathode. The structural variation of the electrodes can imply capacitance drops and cell ruptures.

For instance, in "Electrochimica Acta" (1992), Vol. 37(1), page 63, it is reported how the capacitance of a battery based upon $V_6O_{13}$ quickly declines, and already after 20 cycles is the capacitance reduced by 30%. In "Modern Battery Technology" (1991), C. D. S. Tulk Ed., "Applied Science and Industrial Technology", page 550, it is reported how the capacitance of a battery based upon $V_6O_{13}$ quickly declines after 50–100 cycles at room temperature.

The Applicant has now found a composite cathode constituted by active cathode material, by an electronic conductor and by a polymer electrolyte in which the active cathode material is present in a quantity higher than 50% by weight of the cathode compound and is homogeneously dispersed inside the composite cathode. The higher percentage of active cathode material which is present in the above-mentioned cathode allows to obtain cells, and, therefore batteries, having a particularly high effective capacitance. Moreover, active cathode material particles are homogeneously and individually dispersed inside the polymer matrix and do not tend to aggregate. Light rechargeable solid state batteries containing the above-mentioned cathode can maintain a high capacitance at room temperature even after many cycles, several hundreds of them, of discharge/recharge of the battery itself.

The object of the present invention is, therefore, a composite cathode comprising:
 (A) a powder of active cathode material;
 (B) an active conductor;
 (C) an electrolyte essentially constituted by a polymer composition comprising:
  ($C_1$) a polymer deriving from the polymerisation of a vinyl ether having general formula (I):

wherein R represents a methyl or ethyl and n is an integer comprised between 1 and 16;
  and a divinyl ether having general formula (II):

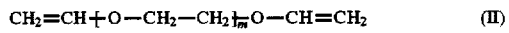

wherein m is an integer comprised between 1 and 10; being the molar ratio between the vinyl ether (I) and the divinyl ether (II) comprised between 98/2 and 40/60;
  ($C_2$) litium tetrafluoroborate ($LiBF_4$) alone or in mixture with other lithium salts.

The polymer composition (C) can optionally contains a plasticizer ($C_3$) selected from oligomers of ethereal nature or mixtures thereof, bipolar aprotic liquids or mixtures thereof, mixtures of oligomers of ethereal nature and bipolar aprotic liquids.

A preferred embodiment of the present invention implies the use of a composite cathode comprising:
 (A) 55%–65% of a powder of active cathode material;
 (B) 5%–10% of an electronic conductor;
 (C) 30%–35% of an electrolyte essentially constituted by a polymer composition comprising:
  ($C_1$) a polymer deriving from the polymerisation of a vinyl ether having general formula (I):

wherein R represents a methyl or ethyl and n is an integer comprised between 1 and 16;
  and a divinyl ether having general formula (II):

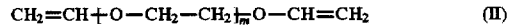

wherein m is an integer comprised between 1 and 10; being the molar ratio between the vinyl ether (I) and the divinyl ether (II) comprised between 98/2 and 40/60;
  ($C_2$) litium tetrafluoroborate ($LiBF_4$) alone or in mixture with other lithium salts in a quantity comprised between 1% and 30% by weight;
  ($C_3$) a plasticizer selected from oligomers of ethereal nature or mixtures thereof, bipolar aprotic liquids or mixtures thereof, mixtures of oligomers of ethereal nature and bipolar aprotic liquids, in a quantity comprised between 20% and 80% by weight.

Powders of active cathode material (A) useful for the purpose of the present invention are, for instance, the ones based upon $V_6O_{13}$, $Li_xV_3O_8$, $TiS_2$, $TiO_2$, $Li_xMn_2O_4$.

The powder of cathode material (A) which is preferred for the purpose is the one based upon $V_6O_{13}$. The $V_6O_{13}$ employed in the present invention can be obtained by thermal decomposition starting from ammonium metavadanate ($NH_4VO_3$) according to the procedure reported in the U.S. Pat. No. 4,228,226. Electronic conductors (B) useful for the purpose of the present invention are, for instance, carbon black, acetylene black.

The electronic conductor (B) preferred for the purpose is the carbon black. The carbon black employed in the present invention is the Ketjen black by AKZO.

The polymer composition (C) useful for the purpose of the present invention is obtained by mixing a polymer ($C_1$) obtained through the polymerisation of a vinyl ether having formula (I) with a divinyl ether having formula (II), the lithium tetrafluoroborate($LiBF_4$), alone or in a mixture with other lithium salts ($C_2$) and, eventually, a plasticizer ($C_3$), according to one of the procedures described in the U.S. Pat. No. 5,411,819, whose description becomes integrant part of the present application.

The preferred vinyl ether having formula (I) is the triethylen-glycol-ethyl-vinyl ether (MVE), whereas the preferred divinyl ether having formula (II) is the triethylen-glycol-divinyl ether (DVE).

The lithium salts which can be employed in mixture with the lithium tetrafluoroborate ($C_2$) useful for the purpose are, for instance, lithium trifluorometan sulfonate ($LiCF_3SO_3$), lithium perchlorate ($LiClO_4$), lithium hexafluoro phosphate ($LiPF_6$), lithium hexafluoro arsenate ($LiAsF_6$), lithium perfluoro sulfonimide ($LiN(CF_3SO_2)_2$).

Oligomers of ethereal nature useful as plasticizers ($C_3$) are, for instance, diglyme, tetraglyme, polyethylen-glycol dimethyl ether.

Bipolar aprotic liquids useful as plasticizers ($C_3$) are, for instance, propylene carbonate (PC), ethylen-carbonate (EC), diethyl carbonate (DEC), γ-butyrolactone, dimethyl carbonate (DMC).

The polymerisation reaction between the vinyl ether having formula (I) and the divinyl ether having formula (II) becomes complete in a period of time comprised between 1 and 6 hours, as a function of the percentage and of the ratio between the monovinyl ether and the divinyl ether and of the quantity of lithium salt.

The end of the polymerisation is confirmed by the FT-IR spectroscopy analysis following the disappearance of the vinyl band (1620 $cm^{-1}$).

A second object of the present invention is a process which allows to obtain the above-mentioned composite cathode.

The composite cathode, object of the present invention, can be obtained through a process which comprises:

grinding the powder of active cathode material until it is obtained particles having an average diameter comprised between 3 μm and 10 μm and drying the powder thus obtained at 100° C. under vacuum;

grinding the powder of electronic conductor until it is obtained particles having an average diameter comprised between 10 μm and 20 μm and drying the powder thus obtained at 100° C. under vacuum;

mixing the two powders in a solvent and agitating them in a rotor containing inert material cylinders (ceramic material, for instance) for about 8 hours until it is obtained a powder having the aspect of a varnish in which the particles of active cathode material have an average diameter comprised between 1 μm and 6 μm and the particles of electronic conductor powder have an average diameter comprised between 6 and 12 μm;

adding the polymeric composition and maintaining the whole under agitation for 3 hours;

recovering the composite cathode after the evaporation of the solvent.

The grinding of the powder of the active cathode material and of the electronic conductor generally occurs in a ceramic material ball mill. The grinding time is of about 5 hours. The solvent employed to mix the two powders can be selected from bipolar aprotic solvents.

The solvent preferred for the purpose is acetonitrile.

The composite cathode which, object of this invention, can be employed in solid electrolytic cells constituted by:

an anode of alkali metal material;

a ionically conducting polymeric electrolyte;

a composite cathode;

a current collector.

In order to better understand the present invention and to put it into practice, some explanatory examples, which are not, anyway, to be intended as restrictive to the significance of the invention itself, are reported hereinafter.

EXAMPLE 1

Preparation of a polymeric composition for a composite cathode

The polymeric composition is obtained by mixing 0.88 g (21.4% by weight) of triethylen-glycol ethyl vinyl ether, 0.38 g (9.3% by weight) of triethylen-glycol divinyl ether and 2.43 g (59.1% by weight) of a plasticizer constituted by a mixture 1:1 of ethylen-carbonate and tetraglyme containing two dissolved lithium salts: 0.34 g (8.2% by weight) of lithium trifluorometan sulfonate and 84 mg (2% by weight on the whole) of lithium tetrafluoroborate.

The polymerisation and cross-linking of the system with the formation of the polymeric composition, which appears in the form of a gel, incorporating the plasticizer and the lithium salts, is complete after about 6 hours.

EXAMPLE 2

Preparation of a polymeric composition for a composite cathode

The polymeric composition is obtained by mixing 0.35 g (21% by weight) of triethylen-glycol ethyl vinyl ether, 0.15 g (9% by weight) of triethylen-glycol divinyl ether and 1.0 g (60% by weight) of a plasticizer constituted by a mixture 1:1 of propilen-carbonate and tetraglyme containing dissolved 0.17 g (10% by weight) of lithium tetrafluoroborate.

The polymerisation and cross-linking of the system with the formation of the polymeric composition, which appears in the form of a gel, incorporating the plasticizer and the lithium salts, is complete after about 2 hours.

EXAMPLE 3

Preparation of the composite cathode

The powder of active cathode material, constituted by vanadium oxide ($V_6O_{13}$ by Kerr McGee), is ground with a ceramic material ball mill for 5 hours.

The granulometry of the particles after the grinding is in the order of 5 μm. The powder, after the grinding, is dried under vacuum at a temperature of 100° C.

The powder of the electronic conductor, constituted by carbon black (Ketjen Black by Akzo), is treated following a process which is analogous to the above-mentioned one. In this case, the dimension of the particles after the grinding is of about 20 μm.

1.28 g (61.7% by weight) of $V_6O_{13}$ and 0.18 g (9.0% by weight) of Ketjen Black are put in a cylindrical steel container together with 20 ml of acetonitrile. The container is then filled with small cylinders of ceramic material, closed and agitated with a rotor for 8 hours.

In this way it is obtained a dispersion of powder having the aspect of a varnish, to which it is added 0.61 g (29.3% by weight) of the polymeric composition obtained according to Example 1 and it is maintained under agitation for still 3 hours.

The composite cathode is recovered after the evaporation of the solvent.

EXAMPLE 4

Preparation of the composite cathode

The powder of active cathode material, constituted by vanadium oxide ($V_6O_{13}$ by Kerr McGee), is ground with a ball mill of ceramic material for 5 hours.

The granulometry of the particles after the grinding is in the order of 5 µm. The powder, after the grinding, is dried under vacuum at a temperature of 100° C.

The powder of electronic conductor, constituted by carbon black (Ketjen Black by Akzo), is treated following a process which is analogous to the above-mentioned one. In this case, the dimension of the particles after the grinding is of about 20 µm.

1.28 g (61.7% by weight) of $V_6O_{13}$ and 0.18 g (9.0% by weight) of Ketjen Black are put in a cylindrical steel container together with 20 ml of acetonitrile. The container is then filled with small cylinders of ceramic material, closed and agitated with a rotorfor 8 hours.

In this way it is obtained a dispersion of powder having the aspect of a varnish, to which it is addes 0.61 g (29.3% by weight) of the polymeric composition obtained according to Example 2 and it is maintained under agitation for still 3 hours.

The composite cathode is recovered after the evaporation of the solvent.

We claim:

1. A composite cathode, having a homogeneously dispersed mixture comprising:

(A) about 55% to 65% of a powder of active cathode material;

(B) about 5% to 10% of an electronic conductor; and (C) about 30% to 35% of an electrolyte essentially constituted by a polymer composition comprising:

($C_1$) a polymer obtained from the polymerization of a vinyl ether having the formula (I):

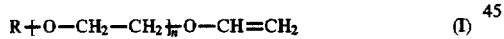

$$R + O - CH_2 - CH_2 \rightarrow_n O - CH = CH_2 \quad (I)$$

wherein R represents methyl or ethyl, and n is an integer between 1 and 16;

and a di-vinyl ether having the formula (II):

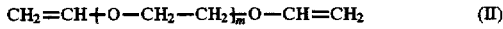

$$CH_2 = CH + O - CH_2 - CH_2 \rightarrow_m O - CH = CH_2 \quad (II)$$

wherein m is an integer between 1 and 10;

wherein the molar ratio between the vinyl ether (I) and the divinyl ether (II) is between about 98/2 and 40/60;

($C_2$) lithium tetrafluoroborate (LiBF$_4$) alone or admixed with other lithium salts; and ($C_3$) a plasticizer selected from the group consisting of oligomers of alkylene oxides and mixtures thereof, bipolar aprotic liquids and mixtures thereof, and mixtures of oligomers of alkylene oxides and bipolar aprotic liquids.

2. The composite cathode of claim 1, wherein the powder of cathode material (A) is selected from the group consisting of $V_6O_{13}$, $Li_xV_3O_8$, $TiS_2$, $TiO_2$ and $Li_xMn_2O_4$.

3. The composite cathode of claim 1, wherein the powder of active cathode material (A) is based upon $V_6O_{13}$.

4. The composite cathode of claim 1, wherein the electronic conductor (B) is selected from the group consisting of carbon black and acetylene black.

5. The composite cathode of claim 1, wherein the electronic conductor (B) is carbon black.

6. The composite cathode of claim 1, wherein the vinyl ether having the formula (I) is triethylene glycol ethyl vinyl ether.

7. The composite cathode of claim 1, wherein the vinyl ether having the formula (II) is triethylene glycol divinyl ether.

8. The composite cathode of claim 1, wherein the lithium salt is employed in a mixture with the lithium tetrafluoroborate and is selected from the group consisting of lithium trifluorometan sulfonate, lithium perchlorate, lithium hexafluoro phosphate, lithium hexafluoro sulfonimide.

9. The composite cathode of claim 1, wherein the plasticizer ($C_3$) is selected from the group consisting of oligomers of alkylene oxide and mixtures thereof.

10. The composite cathode of claim 9, wherein the plasticizer ($C_3$) is selected from the group consisting of diglyme, tetraglyme and polyethylene glycol dimethyl ether.

11. The composite cathode of claim 1, wherein the plasticizer ($C_3$) is selected from the group consisting of bipolar aprotic liquids and mixtures thereof.

12. The composite cathode of claim 11, wherein the plasticizer ($C_3$) is selected from the group consisting of propylene carbonate, ethylene carbonate, diethyl carbonate, γ-butyrolactone and dimethyl carbonate.

13. The composite cathode of claim 1, wherein said electrolyte (C) is in the form of a gel.

14. The composite cathode of claim 1, wherein the active cathode material (A) comprises particles having an average particle size of between 1 and 6 µm.

15. The composite cathode of claim 1, wherein the electronic conductor (B) comprises particles having an average particle size of between 6 and 12 µm.

16. The composite cathode of claim 1, wherein:

($C_2$) lithium tetrafluoroborate alone or admixed with other lithium salts is present in an amount between about 1% and 30% by weight; and ($C_3$) said plasticizer is present in an amount between about 20% and 80% by weight.

17. A solid electrolytic cell, comprising:

a) an anode of an alkali metal;

b) an ionically conducting polymeric electrolyte;

c) a composite cathode; and d) a current collector;

wherein said composite cathode, having a homogeneously dispersed mixture comprises:

(A) about 55% to 65% of a powder of active cathode material;

(B) about 5% to 10% of an electronic conductor; and (C) about 30% to 35% an electrolyte essentially constituted by a polymer composition comprising:

($C_1$) a polymer obtained from the polymerization of a vinyl ether having the formula (I):

$$R + O - CH_2 - CH_2 \rightarrow_n O - CH = CH_2 \quad (I)$$

wherein R represents methyl or ethyl, and n is an integer between 1 and 16;

and a di-vinyl ether having the formula (II):

$$CH_2=CH\!-\!\!\left[O-CH_2-CH_2\right]_{\!m}\!O-CH=CH_2 \qquad (II)$$

wherein m is an integer between 1 and 10;
wherein the molar ratio between the vinyl ether (I) and the divinyl ether (II) is between about 98/2 and 40/60;

($C_2$) lithium tetrafluoroborate ($LiBF_4$) alone or admixed with other lithium salts; and ($C_3$) a plasticizer selected from the group consisting of oligomers of alkylene oxides and mixtures thereof, bipolar aprotic liquids and mixtures thereof, and mixtures of oligomers of alkylene oxides and bipolar aprotic liquids.

* * * * *